Feb. 25, 1936.  E. HANSMANN  2,031,830
WINDSHIELD CLEANER
Filed March 7, 1934   2 Sheets-Sheet 1
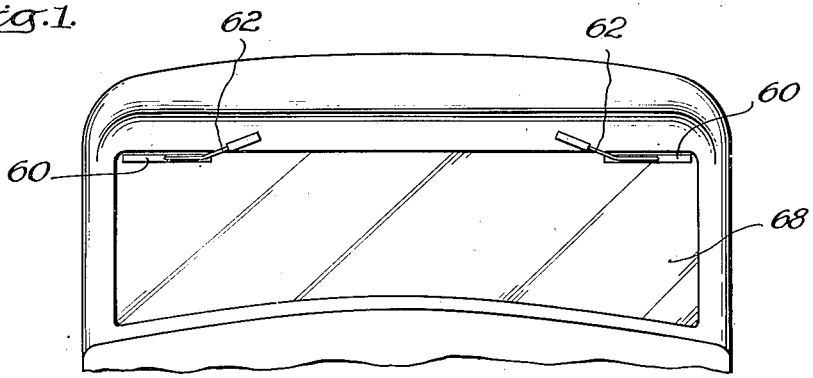
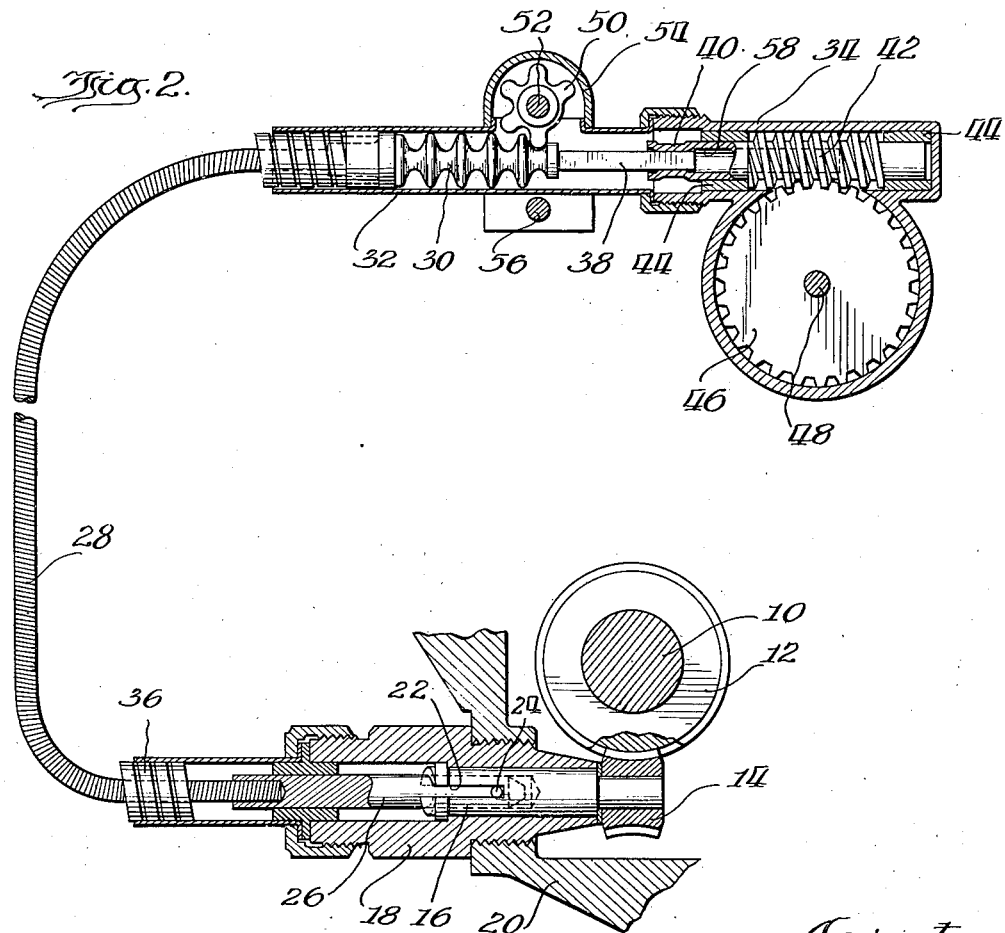

Feb. 25, 1936.  E. HANSMANN  2,031,830
WINDSHIELD CLEANER
Filed March 7, 1934   2 Sheets-Sheet 2
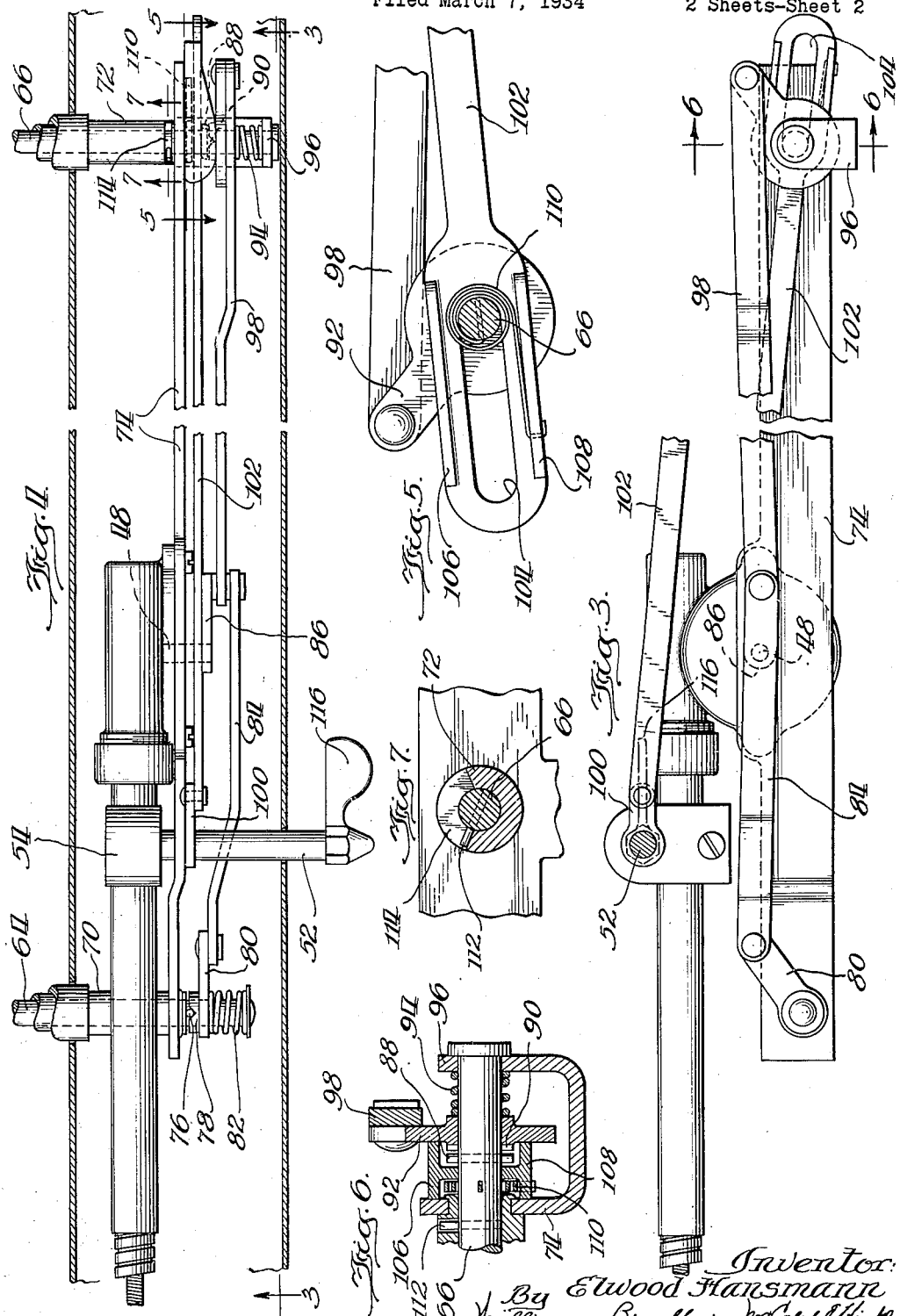
Inventor:
Elwood Hansmann Patented Feb. 25, 1936

2,031,830

UNITED STATES PATENT OFFICE 2,031,830

WINDSHIELD CLEANER

Elwood Hansmann, Glencoe, Ill., assignor to Stewart-Warner Corporation, Chicago, Ill., a corporation of Virginia Application March 7, 1934, Serial No. 714,407

3 Claims. (Cl. 15—255)

My invention relates generally to windshield cleaners, and more particularly to improved means for controlling the starting and stopping of windshield cleaners having two simultaneously operating wipers.

A further object of my invention is to provide improved means for stopping a pair of windshield wipers which oscillate in parallelism, in a position of symmetry, with the wipers extending in opposite directions, thereby to improve the general appearance of the automotive vehicle when the wipers are not in use.

Other objects will appear from the following description, reference being had to the accompanying drawings, in which Figure 1 is a fragmentary front elevation of an automobile showing the windshield wipers in a position of rest;

Figure 2 is a sectional view of the windshield cleaner driving means;

Figure 3 is an elevational view of the wiper operating mechanism, taken on the line 3—3 of Figure 4;

Figure 4 is a plan view of the mechanism shown in Figure 3;

Figure 5 is a sectional view taken on the line 5—5 of Figure 4;

Figure 6 is a sectional view taken on the line 6—6 of Figure 3; and

Figure 7 is a sectional view taken on the line 7—7 of Figure 4.

I have illustrated my invention as applied to a windshield cleaner driven from a rotating part of the automobile engine through a flexible drive shaft, although the invention may be applied to other types of windshield cleaners.

As shown in Figure 2, the windshield cleaner drive is taken from a cam shaft 10 or other rotating part of the automobile engine. The shaft 10 has a worm 12 secured thereto, the worm meshing with a worm wheel 14 secured to the end of a clutch member 16, the latter being journaled in the plug 18 threaded in a crank case 20. The clutch member 16 has a diametrical slot 22 formed therein to receive the projecting ends of a pin 24 which is pressed through a clutch member 26. The member 26 is connected by a flexible drive shaft 28 with a rack 30 mounted in a tube 32, which is secured to a gear casing 34. The flexible shaft 28 is enclosed in a suitable flexible conduit 36. The rack 30 has an extension 38 which is square or of any other suitable non-circular cross-section, and is slidable in the squared portion 40 of the hub of a worm 42 which is journaled in a pair of bushings 44 secured within the gear casing 34. The worm 42 meshes with a worm wheel 46 carried by an operating shaft 48 journaled in a casing 34. A mutilated pinion 50 is secured to a control shaft 52, which is enclosed in a suitable housing 54, the latter being clamped by a bolt 56 to the tube 32.

It will be seen from Figure 2 that counter-clockwise rotation of the shaft 52 will cause the rack 30 to move to the right, exerting a pull upon the flexible drive shaft 28 and separating the clutch members 26 and 16, thus severing the driving connection. During this movement of the rack 30 its extension 38 may move freely into the bore 58 of the worm 42.

The squeegee wipers 60 are secured to bent wiper arms 62, the latter being secured to rock shafts 64, 66, respectively (Figs. 3 and 4) by any suitable resilient connection which will maintain the squeegees in contact with the surface of the windshield 68. The rock shafts 64, 66 are suitably journaled in bearing bushings 70, 72, respectively, which are secured to a mounting plate 74. The rock shaft 64 for the left-hand wiper (Fig. 4) has a pin 76 projecting diametrically therethrough and with its ends projecting therefrom, the ends being adapted to engage in a notch 78 formed in hub of arm 80 which is freely rotatable upon the rock shaft 64 and which is pressed against the pin by a compression coil spring 82. A link 84 has one end pivotally connected to the end of the arm 80 and its other end pivotally connected to a crank arm 86 which is secured to the end of shaft 48.

The right-hand rock shaft 66 similarly has a pin 88 extending therethrough, engageable with a notch 90 formed in the hub of an arm 92 which is freely rotatable upon the rock shaft but normally has its notch held in engagement with the pin 88 by a compression coil spring 94 which is compressed between the arm 92 and a bearing bracket 96, which is secured to or formed integrally with the mounting plate 74. The arm 92 is pivotally connected to one end of a link 98, the other end of which is pivoted to the crank arm 86. The control shaft 52 has a control lever 116 secured at the end thereof within the driving compartment of the automobile. An arm 100 is secured to the control shaft 52 and at its end is pivotally connected to a link 102. The other end of the latter has a slot 104 formed therein for receiving the rock shaft 66. The link 102 adjacent the slot 104 has a pair of sidewardly projecting flanges 106 and 108, these flanges being shaped as shown in Figure 4, to provide wedges for camming the arm 92 outwardly.

When the arm 92 is wedged outwardly, as shown in Figures 4 and 6 of the drawings, shaft 66 is free to be rotated by a spring 110 which has one end engaged in a slot formed in the shaft and its other end engaged in a notch provided in arm 102. Rotation of the shaft 66 under the influence of spring 110 is limited by pin 112 which is pressed into a suitable opening provided in the shaft 66, the end of the pin being adapted to move in a slot 114 formed in the bushing 72. This pin and slot mechanism prevents the spring 110 from rotating the shaft 66 beyond its normal range of movement under the influence of the normal driving mechanism.

When the wiper is in the off position, as shown in Figures 1, 3, 4, 5 and 6 of the drawings, the wiper attached to the shaft 66 is rotated through substantially 180 degrees by the spring 110 and held in this position. When the handle 116 attached to the shaft 52 is rotated in a clockwise direction, as viewed in Figure 3, the clutch 22, 24 is engaged to connect the blade driving mechanism with the cam shaft of the engine and at the same time the broad parts of the wedges 106 and 108 are withdrawn from between the mounting plate 74 and the arm 92, thereby permitting spring 94 to move arm 92 toward the left, as seen in Figure 6, until the hub of the arm rests against the pin 88. As the upper end of arm 92 is moved toward the left, as shown in Figure 3, the notch 90 engages the pin 88 when the arm 92 reaches the extreme limit of its leftward movement and thereafter the shaft 66 and its attached wiper blade oscillate with the arm 92.

When the windshield cleaner is no longer needed, the operator turns handle 116 in a counterclockwise direction, thereby disconnecting the clutch 22, 24 and moving link 102 toward the right, as viewed in Figures 3 and 4, thereby moving the widest parts of the wedges 106 and 107 between the mounting plates 74 and the arm 92. This moves arm 92 to the right, as viewed in Figure 6, and disengages the notch 90 from the pin 88. The rightward movement of the link 102 increases the tension on the spring 110 and this spring thereupon rotates the shaft 66 and its attached wiper blade to the off position shown in Figure 1. As previously stated, this oscillation of the shaft 66 under the influence of spring 110 is limited by pin 112. It should be noted that the link 102 is moved to a position which tensions the spring 110 whenever this spring is called upon to rotate the shaft 66, and that the link 102 is moved to a different position to reduce the tension in spring 110 whenever the shaft 66 is to be oscillated by the normal driving mechanism.

While I have shown and described only one form of my invention, it is to be understood that my invention is capable of assuming numerous forms and that the scope of my invention is to be limited solely by the following claims.

I claim:

1. In mechanism of the class described, a pair of shafts, wiper blades attached thereto, power means for oscillating said shafts, a hand control for said power means, a link connected with and moved by said hand control, wedge means associated with said link, a clutch connected with one of said shafts and controlled by said wedge means, a spring having one end connected to said link and the other end connected to said last-mentioned shaft, the tension of said spring varying with the position of said link, and means for limiting the movement of said last-mentioned shaft under the influence of said spring.

2. In a windshield cleaner of the class described, the combination of a blade operating shaft, a spring having one end operatively connected to said shaft and a second end connected to a movable member, means for mechanically driving said shaft, a handle for moving said member in opposite directions to vary the tension of said spring, and means operated by said handle for disconnecting said driving means from said shaft.

3. In a windshield cleaner of the class described, the combination of a plurality of blade operating shafts, mechanical means for driving said shafts, a spring having one end operatively connected to one only of said shafts and a second end connected to a movable member, means associated with said member for disconnecting said last-mentioned shaft from said driving means, and a handle for moving said member in opposite directions to vary the tension of said spring and to control the connection between said last-mentioned shaft and said driving means.

ELWOOD HANSMANN.